(12) United States Patent
Young

(10) Patent No.: US 8,041,492 B2
(45) Date of Patent: Oct. 18, 2011

(54) ENGINE LOAD MANAGEMENT FOR POWER MACHINES

(75) Inventor: Christopher L. Young, Lisbon, ND (US)

(73) Assignee: Clark Equipment Company, West Fargo, ND (US)

( * ) Notice: Subject to any disclaimer, the term of this patent is extended or adjusted under 35 U.S.C. 154(b) by 1387 days.

(21) Appl. No.: 11/590,437

(22) Filed: Oct. 31, 2006

(65) Prior Publication Data

US 2008/0103638 A1   May 1, 2008

(51) Int. Cl.
   *B60T 8/32* (2006.01)
(52) U.S. Cl. ............ 701/93; 180/293; 180/292; 701/70; 701/94
(58) Field of Classification Search .............. 701/51, 701/54, 99, 101, 102, 110, 53, 87, 70, 93–94; 477/110; 180/65.265, 65.21, 170, 179, 197, 180/292–293; 903/902, 945; 123/357; 60/431; 303/143
See application file for complete search history.

(56) References Cited

U.S. PATENT DOCUMENTS

| | | | |
|---|---|---|---|
| 3,835,382 A * | 9/1974 | Weisbart | 324/161 |
| 3,913,680 A | 10/1975 | Carlson | |
| 4,046,210 A * | 9/1977 | Nelson | 180/24.1 |
| 4,086,563 A | 4/1978 | Bachman | |
| 4,092,789 A * | 6/1978 | Arfons | 37/227 |
| 4,419,654 A | 12/1983 | Funk | |
| 4,589,532 A * | 5/1986 | Ito et al. | 477/81 |
| 4,667,767 A * | 5/1987 | Shea et al. | 180/247 |
| 4,740,898 A | 4/1988 | McKee et al. | |
| 4,961,476 A * | 10/1990 | Witte et al. | 180/197 |
| 5,168,952 A | 12/1992 | Oono et al. | |
| 5,823,280 A * | 10/1998 | Lateur et al. | 180/65.235 |
| 6,062,332 A | 5/2000 | Stephenson et al. | |
| 6,087,734 A * | 7/2000 | Maeda et al. | 290/40 C |
| 6,167,979 B1 * | 1/2001 | Taylor et al. | 180/170 |
| 6,182,448 B1 * | 2/2001 | Ohkura et al. | 60/445 |
| 6,206,798 B1 * | 3/2001 | Johnson | 475/6 |
| 6,216,072 B1 | 4/2001 | Boe et al. | |
| 6,427,108 B1 * | 7/2002 | Kanasugi et al. | 701/51 |
| 6,449,553 B1 * | 9/2002 | Saur et al. | 701/93 |
| 6,678,603 B2 * | 1/2004 | Egawa et al. | 701/96 |
| RE38,790 E * | 9/2005 | Maeda et al. | 290/40 C |

(Continued)

FOREIGN PATENT DOCUMENTS

CA    2278948 A1 *   1/2000

(Continued)

OTHER PUBLICATIONS

Modeling and Control of a Power-Split Hybrid Vehicle; Jinming Liu; Huei Peng; Control Systems Technology, IEEE Transactions on; vol. 16, Issue 6, Nov. 2008 pp. 1242-1251; Digital Object Identifier 10.1109/TCST.2008.919447.*

(Continued)

*Primary Examiner* — Cuong H Nguyen
(74) *Attorney, Agent, or Firm* — John D. Veldhuis-Kroeze; Westman, Champlin & Kelly, P.A.

(57) ABSTRACT

Controlling a drive system for a power machine having an engine is discussed. The method includes receiving a control signal and calculating a base output value based on the control signal. The base output value is compensated for a load applied to the engine. A signal indicative of the compensated output value is provided to a drive component.

17 Claims, 7 Drawing Sheets

U.S. PATENT DOCUMENTS

| | | | |
|---|---|---|---|
| 7,140,459 B2* | 11/2006 | Shimizu | 180/65.225 |
| 7,219,497 B2* | 5/2007 | Kowatari et al. | 60/608 |
| 7,234,990 B2* | 6/2007 | Leonov et al. | 446/440 |
| 7,357,202 B2* | 4/2008 | Kamen et al. | 180/65.1 |
| 7,532,968 B2* | 5/2009 | Kadota | 701/55 |
| 7,552,793 B2* | 6/2009 | Okuda et al. | 180/293 |
| 7,561,954 B2* | 7/2009 | Aizawa et al. | 701/79 |
| 7,708,094 B2* | 5/2010 | Kamen et al. | 180/65.1 |
| 2001/0039472 A1* | 11/2001 | Isogai et al. | 701/96 |
| 2003/0176956 A1* | 9/2003 | Kowatari et al. | 701/22 |
| 2004/0215385 A1* | 10/2004 | Aizawa et al. | 701/93 |
| 2005/0154519 A1* | 7/2005 | Kim | 701/51 |
| 2005/0267663 A1* | 12/2005 | Naono et al. | 701/48 |
| 2007/0135988 A1* | 6/2007 | Kidston et al. | 701/102 |
| 2008/0039990 A1* | 2/2008 | Stevens et al. | 701/22 |
| 2008/0083579 A1* | 4/2008 | Okuda et al. | 180/293 |
| 2008/0103638 A1* | 5/2008 | Young | 701/1 |
| 2008/0154472 A1* | 6/2008 | Okuda et al. | 701/93 |
| 2008/0254941 A1* | 10/2008 | Scott et al. | 477/169 |
| 2008/0319627 A1* | 12/2008 | Kamen et al. | 701/93 |
| 2009/0048748 A1* | 2/2009 | Zhao et al. | 701/59 |
| 2009/0069995 A1* | 3/2009 | Ishida et al. | 701/93 |
| 2009/0228181 A1* | 9/2009 | Luders et al. | 701/67 |
| 2010/0152991 A1* | 6/2010 | Suzuki | 701/99 |

FOREIGN PATENT DOCUMENTS

| | | | |
|---|---|---|---|
| CA | 2608563 A1 * | 4/2008 | |
| CN | 101173634 A * | 5/2008 | |
| DE | 69912693 E * | 12/2003 | |
| EP | 976878 A2 * | 2/2000 | |
| EP | 976878 B1 * | 11/2003 | |
| EP | 1918463 A2 * | 5/2008 | |
| EP | 2112279 A1 * | 10/2009 | |
| GB | 2339761 A * | 2/2000 | |
| JP | 2000-106626 * | 4/2000 | |
| JP | 2001303990 A * | 10/2001 | |
| JP | 2002-071188 * | 3/2002 | |
| JP | 2002-259160 * | 9/2002 | |
| JP | 2004-157295 * | 5/2004 | |
| JP | 2007031182 A * | 2/2007 | |

OTHER PUBLICATIONS

Modeling, Identification, Design, and Implementation of Nonlinear Automotive Idle Speed Control Systems-An Overview; Zhengmao Ye; Systems, Man, and Cybernetics, Part C: Applications and Reviews, IEEE Transactions on, vol. 37, Issue 6, Nov. 2007 pp. 1137-1151; Digital Object Identifier 10.1109/TSMCC.2007.905810.*

Design of an artificial intelligence controller for effective control of engine speed and pump flow according to working condition of an excavator; Soon-Yong Chun et al., TENCON '93. Proceedings. Computer, Communication, Control and Power Engineering.1993 IEEE Region 10 Conference on; Issue 0, Part 40000, Oct. 19-21, 1993 pp. 361-365 v.*

Modelling of a Car Driveline for Servo-Actuated Gear-Shift Control; Lucente, G.; Montanari, M.; Rossi, C.; Industrial Electronics, 2005. ISIE 2005. Proceedings of the IEEE International Symposium on; vol. 1, Jun. 20-23, 2005 pp. 279-286.*

Model-based drive shaft torque estimation and control of a hybrid electric vehicle in energy regeneration mode Xiangpeng Yu et al.; ICCAS-SICE, 2009; Publication Year: 2009, pp. 3543-3548.*

Modelling and identification of car driveline dynamics for anti-jerk controller design; Grotjahn, M. et al.;Mechatronics, 2006 IEEE International Conference on; Digital Object Identifier: 10.1109/ICMECH.2006.252510; Publication Year: 2006, pp. 131-136.*

Speed control for automated manual transmission with dry clutch; Glielmo, L. et al.; Decision and Control, 2004. CDC. 43rd IEEE Conference on; vol. 2; Publication Year: 2004, pp. 1709-1714 vol. 2.*

Coordinated Nonlinear Speed Control Approach for SI Engine With Alternator ;Fang Yang; Kai Zheng; Shen, T.; Kako, J.; Yoshida, S.; Proceedings of the IEEE; vol. 95, Issue: 4; Digital Object Identifier: 10.1109/JPROC.2006.892483 Publication Year: 2007, pp. 796-805.*

Control of a rotational crane considering anti-sway in the radial direction; Tabata, Y.; Makiguchi, K.; Ouchi, S.; Kang-Zhi Liu; SICE 2003 Annual Conference; vol. 3; Digital Object Identifier: 10.1109/SICE.2003.1323597; Publication Year: 2003, pp. 2273-2276 vol. 3.*

Control of a jib-type crane mounted on a flexible structure; Takagi, K.; Nishimura, H.; Control Systems Technology, IEEE Transactions on; vol. 11, Issue: 1; Digital Object Identifier: 10.1109/TCST.2002.806435; Publication Year: 2003, pp. 32-42—4961476 A), or Suzuki et al., (US 20100152991.*

Control of a suspended load using inertia rotors with traveling disturbance; Yoshida, Y.; Robotics and Automation, 2001. Proceedings 2001 ICRA. IEEE International Conference on; vol. 1; Digital Object Identifier: 10.1109/ROBOT.2001.932579 Publication Year: 2001, pp. 368-373 vol. 1.*

Obstacle avoidance control system of rotary crane using proposed haptic joystick; Takemoto, A. et al.; Eurohaptics Conference, 2005 and Symposium on Haptic Interfaces for Virtual Environment and Teleoperator Systems, 2005. World Haptics 2005. First Joint; Digital Object Identifier: 10.1109/WHC.2005.101; Publication Year: 2005.*

LMI-based observer design on a power-split continuously variable transmission for off-road vehicles; Schulte, H.; Control Applications (CCA), 2010 IEEE International Conference on; Digital Object Identifier: 10.1109/CCA.2010.5611192 Publication Year: 2010, pp. 713-718.*

Incorporating control trajectories with the direct torque control scheme of interior permanent magnet synchronous motor drive Haque, M.E.; Rahman, M.F.; Electric Power Applications, IET; vol. 3, Issue: 2; Digital Object Identifier: 10.1049/iet-epa:20070518; Publication Year: 2009, pp. 93-101.*

Analysis and comparison of two different hydraulic thrust systems on shield tunneling machine; Zhibin Liu; Haibo Xie; Huayong Yang; Advanced Intelligent Mechatronics (AIM), 2010 IEEE/ASME International Conference on; Digital Object Identifier: 10.1109/AIM.2010.5695816; Publication Year: 2010, pp. 563-568.*

Coordinated Nonlinear Speed Control Approach for SI Engine With Alternator; Fang Yang; Kai Zheng; Shen, T.; Kako, J.; Yoshida, S.; Proceedings of the IEEE; vol. 95, Issue: 4; Digital Object Identifier: 10.1109/JPROC.2006.892483 Publication Year: 2007, pp. 796-805.*

* cited by examiner

ENGINE LOAD MANAGEMENT FOR POWER MACHINES

BACKGROUND

The present discussion is related to power machines. More particularly, the present discussion is related to providing a propelling force to cause power machines to move. Power machines such as skid steer loaders, tracked vehicles, mini-excavators, utility vehicles, wheel loaders and the like have high utility in construction, landscaping, agriculture, and many other types of applications. Power machines of this type have a power source such as an engine that supplies a power that can cause the power machine to be propelled under the control of an operator. In addition, many power machines of this type utilize tools such as buckets to engage in activities such as earth moving. Digging often involves engaging materials that provide significant resistance, which in turn applies a load onto the power source of the power machine. The applied load can result in reduced performance of the power machine because of loss of power from the power source.

SUMMARY

In one illustrative embodiment, a method of controlling a drive system for a power machine having an engine is discussed. The method includes the steps of receiving a control signal and calculating a base output value based on the control signal. The method further includes compensating the base output value for a load applied to the engine. A signal indicative of the compensated output value is then provided to a drive component.

In another illustrative embodiment, a power machine having an engine and a drive system including an axle with a rotatable member is discussed. The drive system is coupled to the engine. The power machine includes an operator control device that is configured to provide an input signal. The input signal is indicative of a desired rotational speed of the rotational member of the axle. The power machine also includes an engine speed sensor configured to provide an engine speed signal indicative of the speed of the engine. A drive system component is operably coupled to the axle. The drive system component has an actuation device capable of receiving an actuation signal to cause the actuation device to be actuated. The power machine also includes a controller. The controller is configured to receive the input signal and the engine speed signal. The controller provides the actuation signal to cause the drive system component to supply power to move the rotatable member of the axle based at least in part upon the engine speed signal.

In still another illustrative embodiment, a drive system for a power machine that has an engine is discussed. The drive system includes a controller configured to receive an engine speed signal indicative of the speed of the engine and first and second rotatable axles. The drive system also includes first and second drive control mechanisms that are operably coupled to the engine. The first drive control mechanism has a first actuation device configured to receive a first actuation signal. The second drive control mechanism has a second actuation device configured to receive a second actuation signal. The controller provides first and second actuation signals to the first and second actuation devices, each of which are functions of the engine speed signal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

While the above-identified figures set forth one or more illustrative embodiments, other embodiments are also contemplated, as noted herein. In all cases, concepts presented herein describe the embodiments by way of representation and not by limitation. It should be understood that numerous other modifications and embodiments can be devised by those skilled in the art which fall within the scope and spirit of the principles of the discussion herein.

DETAILED DESCRIPTION

Figure 1:
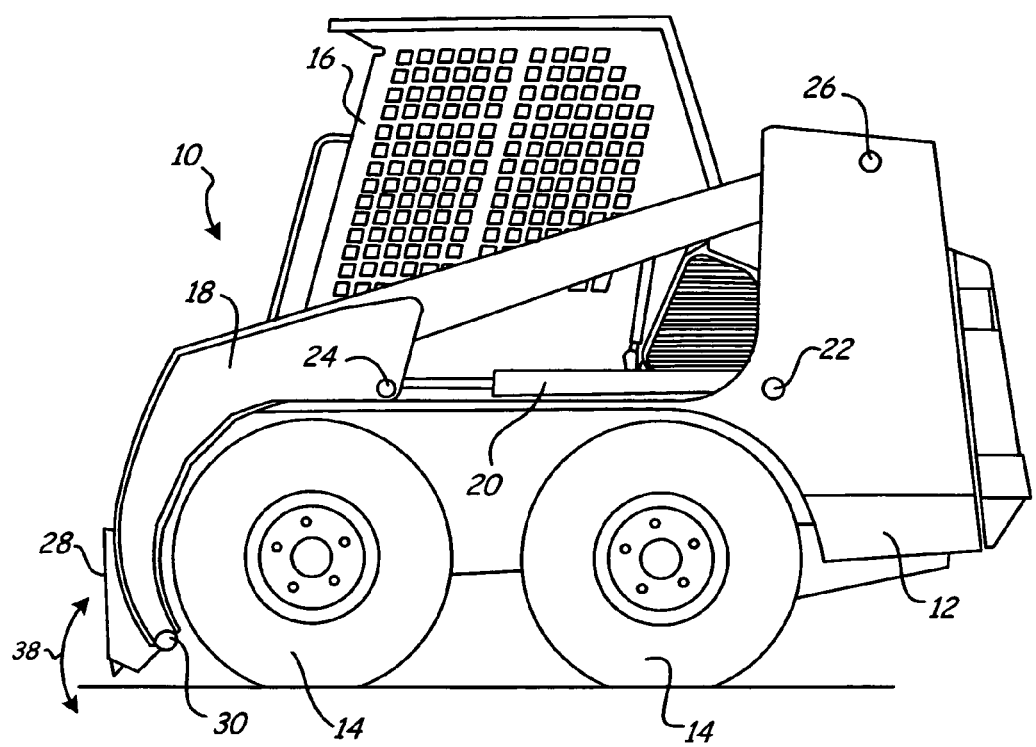
FIG. 1 is a side elevation view of a power machine of the type in which an engine load management system discussed herein might be useful.

FIG. 1 illustrates a power machine 10 of the type in which an engine load management system can be usefully employed. Power machine 10 includes a frame 12 that is supported by wheels 14. Power machine 10 has an engine (not shown in FIG. 1) that applies power to a drive system (not shown in FIG. 1), which in turn supplies power to the wheels 14 causing power machine 10 to move under the control of an operator. Examples of suitable drive systems for power machine 10 will be discussed in more detail below. Frame 12 supports a cab 16, which defines an operating compartment.

An operator can be located inside the cab 16 and control the power machine 10 by manipulating control devices (not shown in FIG. 1) located therein to send operator input signals to the drive system. Although the power machine 10 is shown having a plurality of wheels 14, it should be appreciated that power machine 10 need not have wheels. As one alternative example, power machine 10 can be equipped with one or more tracks that are configured to engage a supporting surface, such as ground, to propel the power machine over the supporting surface.

Power machine 10, as illustrated in FIG. 1, further includes a lift arm 18. Lift arm 18 is coupled to frame 12 at pivot point 26. Actuator 20 is coupled to the frame 12 at first pivot point 22 and the lift arm at second pivot point 24. Actuator 20, of the power machine 10 shown in FIG. 1 is a hydraulic cylinder, although other suitable types of actuators may be used. A single lift arm 18 is shown in FIG. 1, but it is to be understood that a similar lift arm 18 and corresponding actuator 20 may be positioned on the opposite side of the cab and similarly attached to frame 12. Further, it should be understood that such a lift arm may be coupled to the lift arm 18 shown in FIG.

1 via a cross-member (not shown) extending between and attached to each of the lift arms 18.

Power machine 10 further includes an attachment interface 28, which is rotatably coupled to the lift arm 18 about attachment point 30. One or more tilt actuators (not shown) are coupled to the attachment interface 28 and the one or more lift arms 18 (or the cross-member therebetween). Actuation of the one or more tilt actuators causes the attachment interface 28 to rotate about the attachment point 30 in a direction shown by arrow 38. Attachment interface 28 is configured to engage and be attached to a variety of different work implements such as a bucket, a planer, a post-hole auger, and the like. By utilizing the various attachments available to be connected to the power machine 10 at attachment interface 28, the power machine 10 provides a desirable and suitable tool to accomplish a number of different types of tasks. For example, by attaching a bucket (not shown) to power machine 10, an operator is capable of digging earth, moving material, and any number of tasks related to landscaping, construction, material removal, or any number of different types of applications.

The power machine 10 illustrated in FIG. 1 is a skid steer loader. A skid steer loader has rigid axles coupled to each of the wheels 14. The wheels 14 on each side of the skid steer loader are operably coupled to each so that they operate in tandem. Each side of the skid steer loader has its own drive system, which supplies power to the wheels on that particular side. Steering is accomplished by controlling the drive system of one or both sides of the machine to cause the machine to skid on the supporting surface in a direction that is desired by the operator.

As one illustrative example, an operator wishing to move or turn power machine 10 to the right may cause the wheels 14 on the left side of the power machine 10 to move in a forward direction. In addition, the operator can cause the wheels 14 on the right side to move in a reverse direction, not at all, or in a forward direction at a lesser rate of speed than the left side wheels 14. The net effect is a forward force applied to the left side of the power machine 10 that is greater than the forward force applied to the right hand side. As a result, the power machine 10 will skid on its wheels 14 to the right. This is just one non-limiting example of how a skid steer loader can be operated. Other steering operations can be employed to accomplish a right turn, for example. Although the illustrative example of the power machine 10 in FIG. 1 is a skid steer loader, the discussion provided in this document need not be limited to skid steer loaders. Alternatively, and without limitation, the discussion herein can be applied to other power machines such as wheeled loaders with a front or rear steerable axle, excavators, utility vehicles, all-wheel steer vehicles, tracked loaders, or any other similar power machine.

Figure 2:
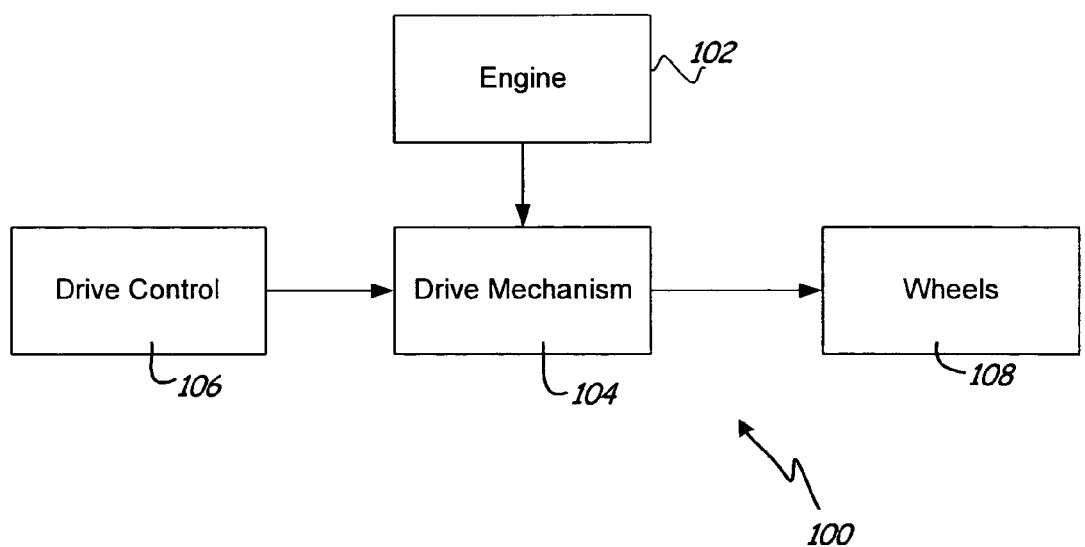
FIG. 2 is block diagram illustrating a drive system for the power machine of FIG. 1 configured to provide engine load management according to one illustrative embodiment.

FIG. 2 illustrates a block diagram of a drive system 100 for providing a propelling power to cause power machine 10 to move in accordance with one illustrative embodiment. Drive system 100 receives power from an engine 102 that is located within the power machine 10. Engine 102 is coupled to a drive mechanism 104 to provide the drive mechanism 104 with an input power source. Drive mechanism 104 receives drive control signals indicated by block 106 from an operator to control the drive mechanism 104. Drive mechanism 104 then provides an output to wheels 108 (or alternatively, for example, tracks) to cause the power machine 10 to move.

In one embodiment, the drive mechanism 104 includes a hydraulic or hydrostatic drive system. Other types of drive mechanisms can be used without departing from the spirit and scope of the discussion. Drive control 106 provides drive signals to the drive mechanism 104 in response to manipulation by an operator of one or more control devices such as levers, buttons, dials, pedals, joysticks, or any other type of actuable control device that may be appropriate. As the power machine 10 is illustratively described as a skid steer loader, steering the power machine 10, as well as propelling, is accomplished by the operation of the drive mechanism 104. In alternative embodiments, steering control devices that are separate from the drive mechanism in a particular power machine may or may not be relevant to the control of that drive mechanism.

As discussed above, power machine 10 can utilize various attachments to accomplish a wide variety of tasks in different applications. One particular application mentioned above is the use of a bucket for digging. When an operator is operating the power machine 10 for the purposes of digging a hole, for example, the resistance that the power machine 10 can encounter from moving into and engaging tightly compacted earth causes the power to slow down and also transfers a load onto the engine 102.

It is desirable to operate the power machine 10 at an engine speed at which the engine 102 supplies the maximum torque to the drive mechanism 104. If an operator manipulates control devices to cause the drive mechanism 104 to attempt to supply too much power to the wheels 108 in a loaded condition, the resultant load will cause the engine 102 to slow down and deliver less power to the drive mechanism. Operating the power machine 10 in such a manner results in reduced efficiency of operation. Furthermore, if the speed of the engine 102 slows below a certain threshold level, the engine will reach a point where it will shut down and stop operating, even if the load is removed. An operator can restart the engine, but repeated episodes of having the engine 102 stop and be restarted also results in a loss of efficiency of operation of the power machine 10.

An operator can reduce the load on engine 102 by manipulating the control devices to reduce the drive signals provided by drive control 106 to the drive mechanism 104, which in turn causes the drive mechanism to reduce the power supplied to the wheels 108. By reducing the power supplied to the wheels 108, the load on the engine 102 is reduced. In situations where there is an extreme load on the engine 102, if the operator does so before the engine slows to the point where it cannot recover, the engine 102 will recover and begin to operate at a potentially more efficient speed. As the load applied to the engine 102 varies, the operator may have to vary his or her manipulation of control devices to prevent the engine 102 from stopping. In addition, it should be appreciated that by manually varying the control devices to control the drive mechanism, the operator may not operate the power machine 10 at an optimum efficiency. By providing a drive system 100 that compensates for increased load on the engine, the drive system 100 can operate the power machine 10 with an efficient load on the engine 102. Therefore, the engine 102 can operate at an optimum speed and supply an optimum torque so that the power machine 10 can accomplish work efficiently.

Figure 3:
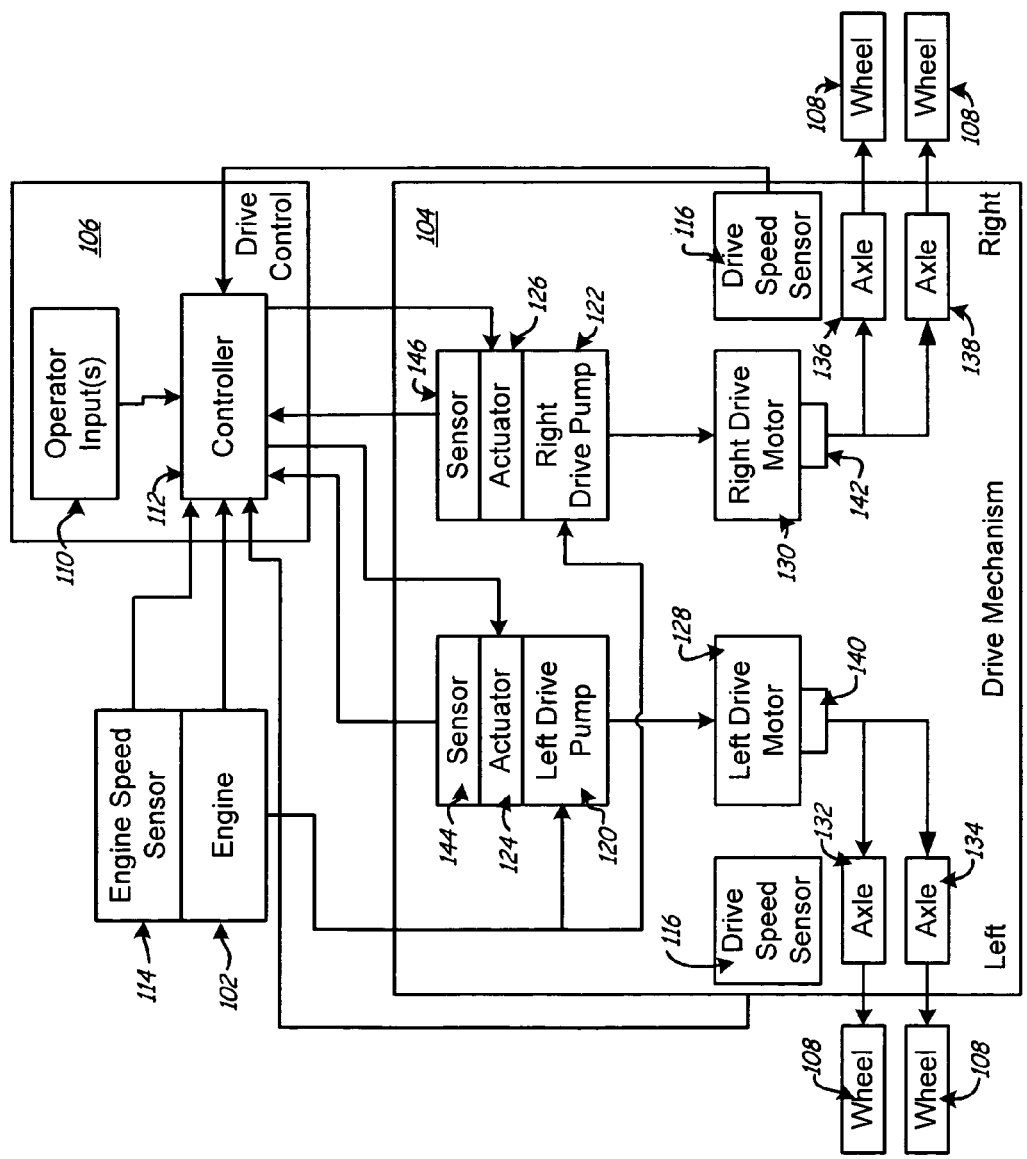
FIG. 3 is a more detailed block diagram of the drive system of FIG. 2.

FIG. 3 illustrates the drive system 100, which is configured to manage a load on its engine, in more detail according to one illustrative embodiment. Drive control 106 includes a controller 112 that is configured to receive one or more operator inputs 110. Operator inputs 110, in one illustrative embodiment, include a pair of inputs, one for the left-hand side of the power machine 10 and another for the right-hand side of the power machine 10. The operator input 110 corresponding to the left-hand side of the power machine 10 provides a signal indicative of a desired speed and direction in which the wheels on the left-hand side should be propelled. Similarly, the operator input 110 corresponding to the right-hand side of the power machine 10 provides a signal indicative of a desired speed and direction in which the wheels on the right-hand side should be propelled. Other configurations of operator inputs 110 can be provided. As just one illustrative example, a drive input can be provided to indicate the desired speed and direction (forward or reverse) in which power machine 10 should be propelled and a steering input can be provided to indicate whether and how much the power machine should be turned. Controller 112 can be any type of logic device capable of receiving inputs and providing output signals to control various devices. For example, controller 112 can be a microprocessor-based device.

Controller 112 can also be configured to receive signals indicative of operating conditions of various systems in the power machine 10. For example, controller 112 receives a signal from an engine speed sensor 114, which is indicative of the rotational speed of the engine. Engine speed sensor 114 can be any type of device capable of measuring the rotation of an engine. For example, engine speed sensor 114 can be a magnetic pickup capable of providing a signal indicative of the presence or absence of a tooth on a flywheel that is rotating in close proximity to the engine speed sensor 114.

In addition, controller 112 is configured to receive inputs from one or more drive speed sensors 116. The one or more drive speed sensors 116, in one illustrative embodiment, are each positioned to measure the rotational speed of one of the wheels 108. Alternatively, one or more of the drive speed sensors 116 can be positioned to measure the rotation of one of the axles that is rigidly coupled to one of the wheels 108.

As discussed above, power machine 10 is a skid steer loader, which has the wheels 108 on each of the left and right hand sides of the power machine 10 driven together. Thus, a single drive speed sensor 116 measuring the speed of a wheel 108 on the left-hand side of the machine could provide information indicative of the wheel speed of each of the wheels 108 on the left-hand side of the machine. Similarly, a drive speed sensor 116 on the right-hand side of the machine measuring the wheel speed of one of the wheels 108 can provide information indicative of the wheel speed of both of the wheels 108 on the right-hand side of the power machine 10.

In alternative embodiments, other configurations of drive speed sensors 116 may be provided. For example, a drive speed sensor 116 may be provided for each wheel 108. Alternatively, a single drive speed sensor 116 may be provided for the rear wheels and/or the front wheels, in embodiments where the front and/or rear wheels operate in tandem. Alternatively still, the drive speed sensors 116 may measure the speed of an axle in the case of a tracked machine. Alternatively still, controller 112 may not receive signals indicative of the wheel speed from any wheel speed sensors.

Referring again to FIG. 3, the drive mechanism 104 of the illustrative embodiment includes a left drive pump 120 and a right drive pump 122, which provide hydraulic power for the left and right sides of the drive mechanism 104, respectively. Left drive pump 120 has an actuation mechanism 124, which, when actuated, causes oil to flow from the left drive pump 120 to a left drive motor 128. The actuation mechanism 124 is a variable position device, which can cause oil flow from the left drive pump 120 to the left drive motor 128 to vary in rate and direction, depending on the position of the actuation mechanism 124. In one illustrative embodiment, a position sensor 144 is provided to measure the position of the actuation mechanism 124. Position sensor 144 can provide a position feedback signal to controller 112 that can be used to determine the signal sent to the actuation mechanism 124.

As will be discussed in more detail below, providing flow in one direction will cause an output shaft 140 on the left drive motor 128 to turn in one direction. Providing flow in the other direction will cause the output shaft 140 on the left drive motor 128 to turn in the other direction. By varying the position of the actuation mechanism 124, the rate and direction of flow of hydraulic oil from the left drive pump 120 to the left drive motor 128 can be controlled. Thus, rotation of the output shaft 140 of left drive motor 128 is controlled. Similarly, right drive pump 122 has an actuation mechanism 126, which can be actuated in various positions to control the direction and rate of oil flow to a right driver motor 130. A position sensor 146, in one illustrative embodiment, provides a position signal to controller 112.

The output shaft 140 of the left drive motor 128 is operably coupled to left front axle 132 and left rear axle 134. Left front axle 132 is in turn coupled to a wheel 108 and left rear axle 134 is likewise coupled to a wheel 108. The operable coupling of the left drive motor 128 to both the left front axle 132 and the left rear axle 134 can be accomplished, in one illustrative example, by an arrangement of chains and sprockets that engage the output shaft 140 of the left hydraulic motor 128 and the left front axle 132 and the left rear axle 134. In an alternative embodiment, a pair of left drive motors 128 are drive by the left drive pump 120. One of the left drive motors is coupled to the left front axle 132 and the other of which is coupled to the left rear axle 134.

The output shaft 140 of the left drive motor 128 is thus capable of driving the left front axle 132 and the left rear axle 134 in a forward or reverse direction depending upon its direction of rotation. Of course, as described above, the direction of rotation of the output shaft 140 of the left drive motor 128 is controlled by the direction of flow of oil from the left drive pump 120 to the left drive motor 128.

Similarly, right drive pump 122 provides hydraulic oil to the right drive motor 130 in one of two directions. An output shaft 142 of the right drive motor 130 then is coupled to right front axle 136 and right rear axle 138. Right front axle 136 and right rear axle 138 are in turn coupled to wheels 108 on the right-hand side of the machine. Alternatively, too, a pair of right drive motors 130 can be incorporated, one of which is coupled to the right front axle 136 and the other of which is coupled to the left rear axle 138.

Figure 4:
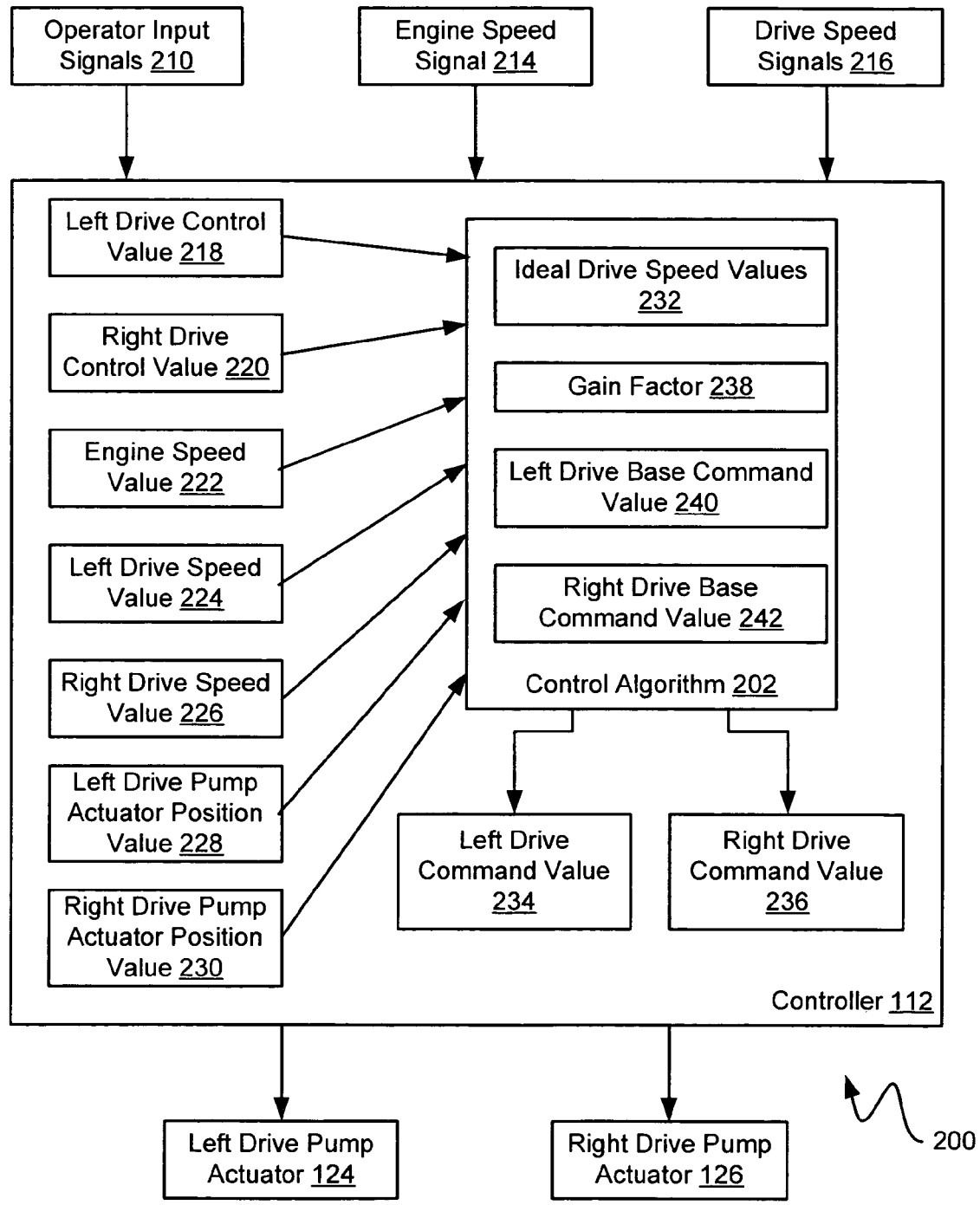
FIG. 4 is a block diagram illustrating the inputs to a control algorithm for providing command values to control power components in the drive system of FIG. 3.
Figure 5:
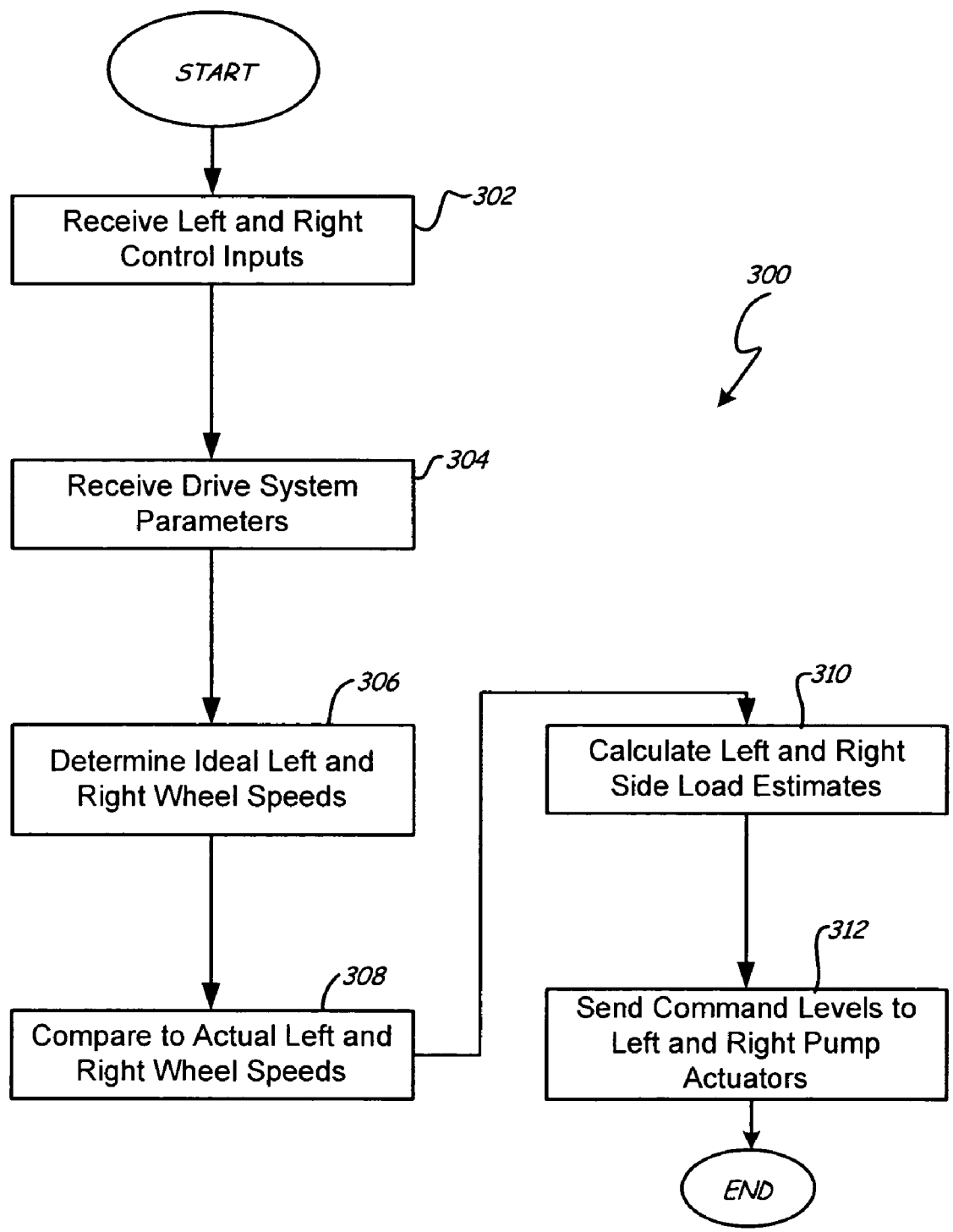
FIG. 5 is a functional block diagram illustrating a method of providing engine load management according to one illustrative embodiment.

FIG. 4 illustrates a load management schematic block diagram 200 and FIG. 5 illustrates a flow chart 300 detailing a system and method, respectively, for providing engine load management according to one illustrative embodiment. Controller 112 is configured to execute a control algorithm 202. Control algorithm 202 receives a plurality of input values, which will be discussed below. Based upon those input values, control algorithm 202 calculates left and right pump actuator command values 234 and 236, which are indicative of control signals to be provided to control left and right drive pump actuators 124 and 126. It is to be understood that control algorithm 202 is directly related to the calculation of the left and right drive command values 234 and 236. For the purposes of this discussion, it should be recognized that controller 112 can perform other tasks and execute other algorithms than the control algorithm 202, even as is related to the control of left and right drive pump actuators 124 and 126.

Control algorithm 202 first receives a left drive control input 218 and a right drive control input 220 indicative of a desired wheel speed for the left and right sides of the power machine 10. This is indicated by block 302 of FIG. 5. The left drive control input 218 and the right drive control input 220 are provided by reading the one or more operator inputs 110. Based on these drive control values, the control algorithm 202 calculates left and right drive base command values 240 and 242. It should be understood that these drive base command values represent calculated values located within controller 112 based upon the signals received from the operator inputs 110.

The actual calculation of the left and right drive base command values 240 and 242 can be done in any manner. The result of the calculations is, in one illustrative embodiment, left and right drive base command values 240 and 242 that are indicative of an input from the operator regarding the desired wheel speed of the left and right wheels 108 of the power machine 10. For example, the left and right drive base command values 240 and 242 may include adjustment to account for any control curve that may be applied to the left and right drive control values 218 and 220. In addition, the input signals 110 may be filtered to reduce the introduction of noise into the left and right drive control values 218 and 220.

The control algorithm 202 also receives a number of values related to drive system parameters This is indicated by block 304. The control algorithm 202 receives an engine speed input value 222 indicative of an engine speed signal 214 received from the engine speed sensor 114 located on the power machine 10. The control algorithm 202 also receives left and right drive speed values 224 and 226 indicative of the signals 216 received from the drive speed sensors 116 measuring, in one illustrative embodiment, the actual speed of the left and right wheels 14 of power machine 10.

In addition, the control algorithm 202 receives a left drive pump actuator position value 228 and a right drive pump actuator position value 230, which are indicative of the position of the left and right drive pump actuators 124 and 126. The left and right drive pump actuator position values 228 and 230 can provide feedback information to determine whether the left and right drive pump actuators 124 and 126 are in a desired position. Alternatively, the control algorithm 202 may receive only some of these values. As one illustrative example, the control algorithm may not receive the left and right drive pump actuator position values 228 and 230. As another illustrative example, the control algorithm 202 may receive only the engine speed input value 222.

As shown in block 306, the control algorithm 202 then determines the ideal drive speeds 232 for the left and right wheels. In one illustrative embodiment, the ideal drive speeds 232 are a function of the engine speed of the vehicle and the left and right drive control values 218 and 220. In one illustrative embodiment, control algorithm 202 accesses previously stored ideal drive speeds 232. The ideal drive speeds 232 includes information that provides an ideal drive speed given a particular drive pump control value and at the given engine speed. Thus, the ideal drive speeds 232 are provided based on the inputs of the left drive control value 218 and the right drive control value 220 as well as the engine speed value 222. The ideal drive speeds 232 can be calculated or provided in a previously stored lookup table.

Next, the control algorithm compares the left and right drive speed values 224 and 226 to the ideal drive speeds 232. This is indicated by block 308. Left and right drive speed differences are calculated that indicate a difference between the ideal drive speed and the drive speed values as follows:

Left DSD=Left IDS−Left DSV

Right DSD=Right IDS−Right DSV where DSD is the drive speed difference, IDS is the ideal drive speed and DSV is the actual drive speed. Because power machine 10 in the illustrative embodiment is a skid steer loader, the ideal and actual drive speeds for the left side may differ from the ideal and actual drive speeds for the right side. Other types of power machines may have only one ideal drive speed number and all wheels on the power machine will be compared against the one ideal drive speed value. Only those situations where the actual drive speed is less than the ideal drive speed are relevant to any engine load management situations. Therefore, if either (or both) of the Left DSD or Right DSD is less than zero, the DSD is set to zero.

After the control algorithm 202 has determined the left and right drive speed differences, the control algorithm 202 calculates left side and right side load values, which is indicated by block 310. The load values have an inverse relationship to the engine speed value 222. Thus, as the engine speed of the power machine decreases, the load value will increase. The actual engine speed is compared to an optimum engine speed, which, in one illustrative embodiment, is the engine speed at which the engine achieves peak torque. The left load and right load values are calculated as follows:

Left Load Value=(Left DSD*OES/AES)$^2$

Right Load Value=(Right DSD*OES/AES)$^2$ where OES is the optimum engine speed and AES is the engine speed value 222.

Once the left and right load values are calculated, the control algorithm 202 provides an appropriate left drive command value 234 and right drive command value 236. The left and right drive command values 234 and 236 are indicative of desired actuation of the left and right drive pump actuators 124 and 126. This is illustrated by block 312 in FIG. 5. Controller 112 can then send a signal to cause the left and right drive pump actuators 124 and 126 to a position indicated by the left and right drive command values 234 and 236.

Figure 6:
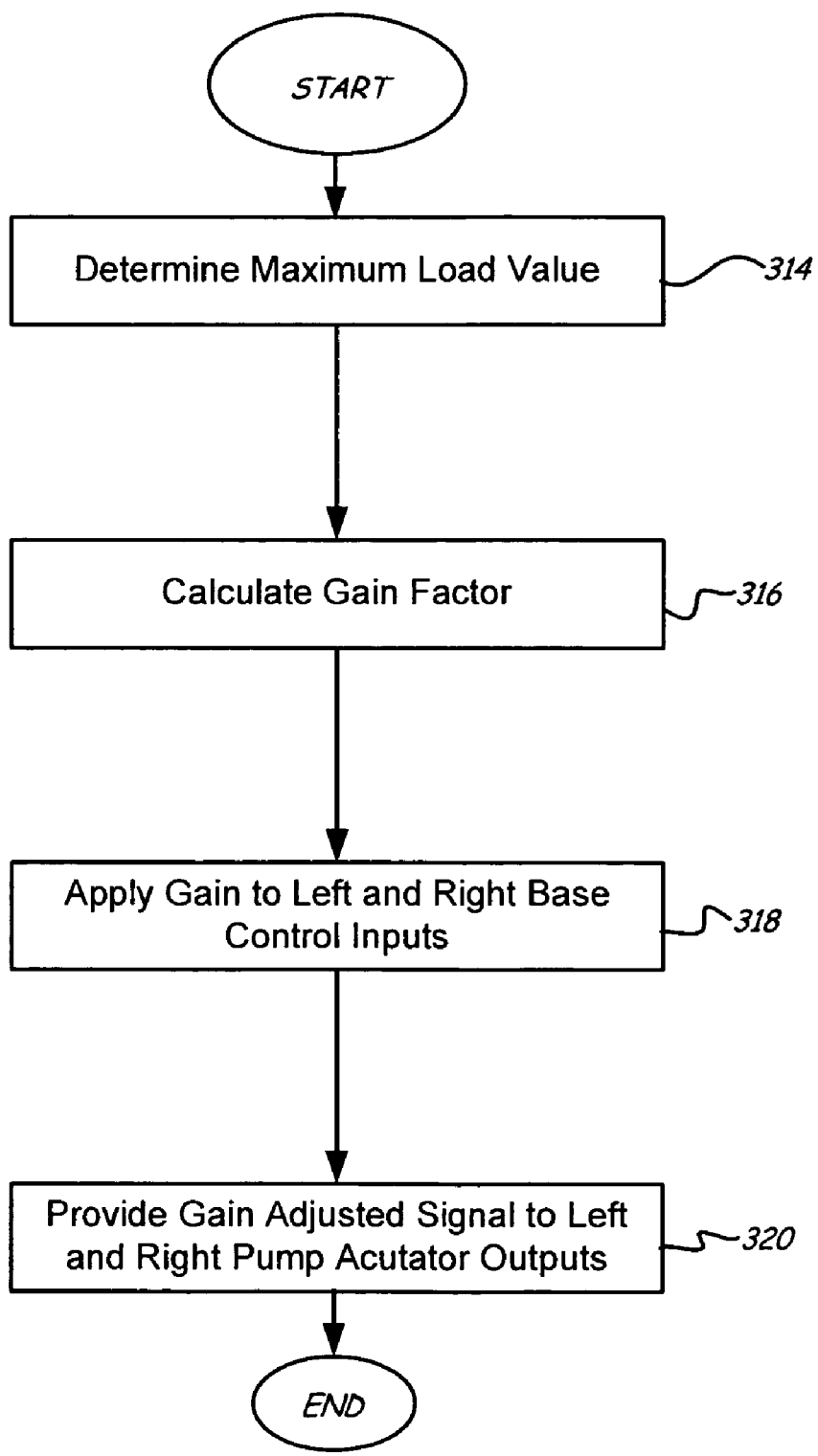
FIG. 6 is a functional block diagram providing additional detail of the method of FIG. 5.

FIG. 6 illustrates a detailed description of block 312 of FIG. 5. To determine the appropriate command level to send to the left and right pump actuators, control algorithm 202 first determines the maximum load value. This is shown in block 314. The maximum load value, in one illustrative embodiment, is the larger of the left and right load value that were previously calculated. Alternatively, other methods can be used to determine the maximum load value. For example, the average of the left and right load values could be used or the minimum of the left and right load values could be used. These are but two other illustrative examples that are not meant to be limiting.

Figure 7:
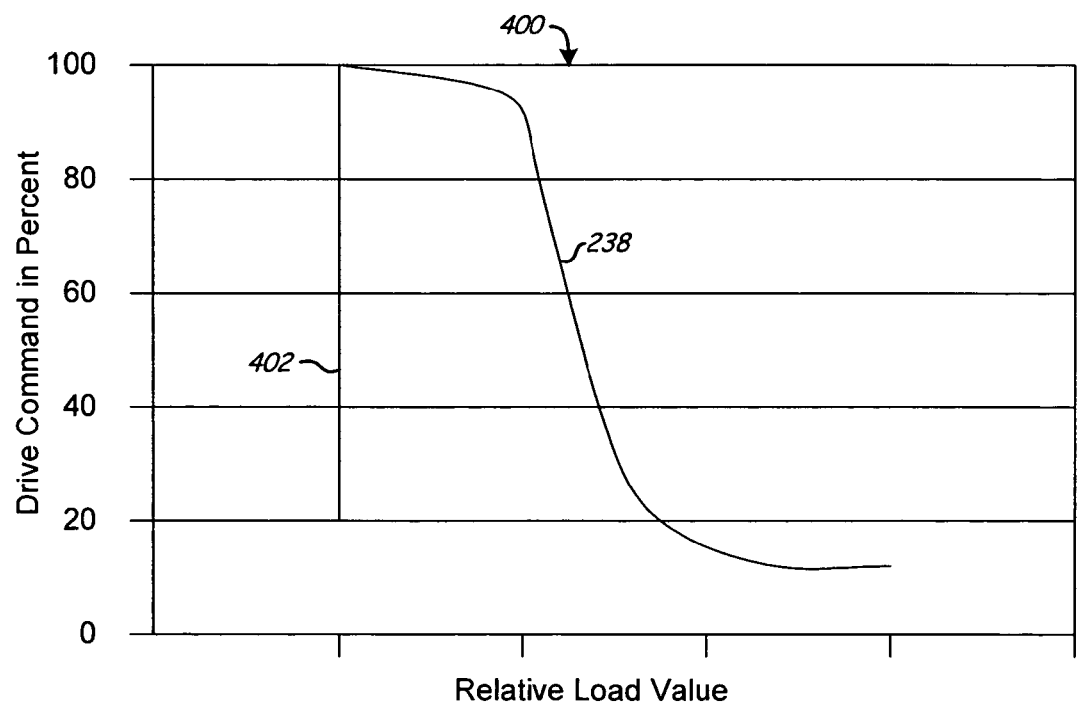
FIG. 7 is a chart illustrating a representative gain control function for a drive system of a power machine for managing engine load for a power machine according to one illustrative embodiment.

Once the maximum load value has been determined, the control algorithm 202 calculates a gain factor 238 as is indicated by block 316. In one illustrative embodiment, the gain factor 238 is calculated by accessing previously stored gain factor data as compared to the maximum load value. Alternatively, calculations can be made based on a formula to determine a gain factor. FIG. 7 provides a curve 400 that is a representative gain factor 238 plotted as a function of a drive command signal against a relative load applied against the engine 102.

Once the gain factor 238 has been obtained, the left and right drive command values 234 and 236 are calculated as a function of the left and right drive base command values 240 and 242 and the gain factor 228. This is indicated by block 318. In one illustrative embodiment, the left and right drive base command values 240 and 242 are multiplied by the gain factor 238 to arrive at the left and right drive command values 234 and 236. For example, in one illustrative embodiment, the gain factor has a value between zero and one. Thus, when the maximum load is zero or below a threshold value 402, the gain factor 238 is 1 and the left and right drive command values 234 and 236 equal the left and right drive base command values 240 and 242, respectively. As the load increases, the gain factor 238 decreases as is shown in curve 400. Once the gain has been determined and applied to the left and right control inputs, the gain adjusted signal is provided to the left and right outputs. This is indicated by block 320. Other calculations can be made to determine the drive command values 234 and 236 besides multiplying the gain factor 238 against the left and right drive base command values 240 and 242. In addition, in some illustrative embodiments, a gain factor 238 can have a different value for the left and right sides of the power machine 10. Of course, a power machine that is not a skid steer loader may have only a single drive command value and a single gain factor.

The system described above provides several important advantages. For example, by reducing the output to left and right drive pump actuators, it is possible to reduce the likelihood that the engine of the power machine will stop during operation of the machine. In addition, the engine load management system described above provides for a way to improve the efficiency of the machine. In such situation, the machine-will operate at peak efficiency, thereby providing maximum work effort without having subsequent drop-off and engine speed. Thus, an operator can operate the machine without having to adjust its control signals for perceived or actual load changes.

Although the discussion has been focused upon illustrative embodiments, workers skilled in the art will recognize that changes may be made in form and detail without departing from the spirit and the scope of the discussion.

What is claimed is:

1. A computer-implemented method of controlling a drive system for a power machine having an engine, with the drive system operably coupled to the engine and including an axle with a rotatable member, comprising:
   receiving a control signal and employing a processor to calculate a base output value based on the control signal;
   compensating the base output value for a load applied to the engine to create a compensated output value, wherein the step of compensating the base output value comprises:
      receiving an engine speed signal indicative of engine speed;
      calculating an engine speed value as a function of the engine speed signal;
      comparing the engine speed value with a desired engine speed value; and
      determining a gain factor based on the engine speed value and the desired engine speed value; and
   providing a signal indicative of the compensated output value to a drive component to control the rotatable member.

2. The computer-implemented method of claim 1, wherein the step of compensating the base output value comprises:
   calculating a gain; and
   multiplying the base output value by the gain.

3. The computer-implemented method of claim 1, wherein the step of providing a signal to a drive component includes providing the signal to a drive component operably coupled to more than one wheel on one side of the power machine.

4. A drive system for a power machine having an engine, comprising:
   a controller that is configured to receive an engine speed signal indicative of the speed of the engine;
   first and second rotatable axles;
   a first hydraulic drive mechanism operably coupled to the engine and the first axle and having a first actuation device configured to receive a first actuation signal;
   a second hydraulic drive mechanism operably coupled to the engine and the second axle and having a second actuation device configured to receive a second actuation signal;
   wherein the controller is configured to provide the first and second actuation signals to the first and second actuation devices, and wherein the first and second actuation signals are determined as functions of the engine speed signal and an ideal engine speed signal.

5. The computer-implemented method of claim 1, and further comprising:
   receiving a drive speed signal indicative of the rotational speed of an axle on the power machine; and
   calculating a drive speed value as a function of the drive speed signal.

6. The computer-implemented method of claim 5, wherein the step of receiving a drive speed signal includes receiving a signal from a sensor configured to measure the rotational speed of a wheel rigidly coupled to the axle.

7. The computer-implemented method of claim 5, wherein the step of compensating the base output value comprises:
   calculating a gain as a function of the drive speed value.

8. The computer-implemented method of claim 5, wherein the step of compensating the base output value comprises:
   calculating a gain as a function of the drive speed value and a desired drive speed value.

9. The computer-implemented method of claim 5, wherein compensating the base output value further comprises:
   calculating a gain as a function of the drive speed value and the engine speed value.

10. The drive system of claim 4, wherein the controller is configured to provide the actuation signal to the actuation device of the first hydraulic drive mechanism to cause the first axle to rotate at a different speed than the second axle.

11. The drive system of claim 4, and further comprising:
   first and second drive speed sensors configured to provide first and second drive speed signals;
   wherein the controller is configured to receive the first and second drive speed signals; and
   wherein the first and second actuation signals are based at least in part upon the first and second drive speed signals, respectively.

12. A power machine having an engine and a drive system including an axle with a rotatable member coupled to the engine, the power machine comprising:
   an operator input device configured to provide an input signal indicative of a desired rotational speed of the rotational member of the axle;
   an engine speed sensor configured to provide an engine speed signal indicative of the speed of the engine;
   an actuable drive system component operably coupled to the axle and configured to supply an amount of power to move the rotatable member of the axle when actuated and having an actuation device configured to receive a variable actuation signal to cause the actuation device to be actuated, wherein the variable actuation signal is indicative of the amount of power to be supplied to the rotatable member; and
   a controller configured to receive the input signal and the engine speed signal and provide the variable actuation signal to the actuation device, wherein the variable actuation signal provided by the controller is adjusted by a factor related to the ratio of the engine speed indicated by the engine speed signal and an ideal engine speed.

13. The power machine of claim 12, and further comprising:
   a wheel fixedly coupled to the rotatable member of the axle;
   a wheel speed sensor configured to provide a wheel speed signal indicative of the rotational speed of the wheel; and wherein the controller is configured to receive the wheel speed signal and wherein the actuation signal is based at least in part on the wheel speed signal.

14. The power machine of claim 13, wherein the controller is configured to compare the wheel speed signal to a desired wheel speed signal and wherein the actuation signal is based at least in part on difference between the wheel speed signal and the desired wheel speed signal.

15. The power machine of claim 12, wherein the actuable drive system component operably coupled to the axle is configured to supply an amount of hydraulic power to move the rotatable member of the axle.

16. The drive system of claim 11, wherein the controller determines a first desired drive speed and wherein the first actuation signal is based in part upon a difference between the first drive speed signal and the first desired drive speed.

17. The drive system of claim 16, wherein the controller determines a second desired drive speed and wherein the second actuation signal is based in part upon a difference between the second drive speed signal and the second desired drive speed.

* * * * *